F. WESTERBECK.
CAN MAKING MACHINE.
APPLICATION FILED AUG. 6, 1913.
1,129,532.
Patented Feb. 23, 1915.
8 SHEETS—SHEET 4.
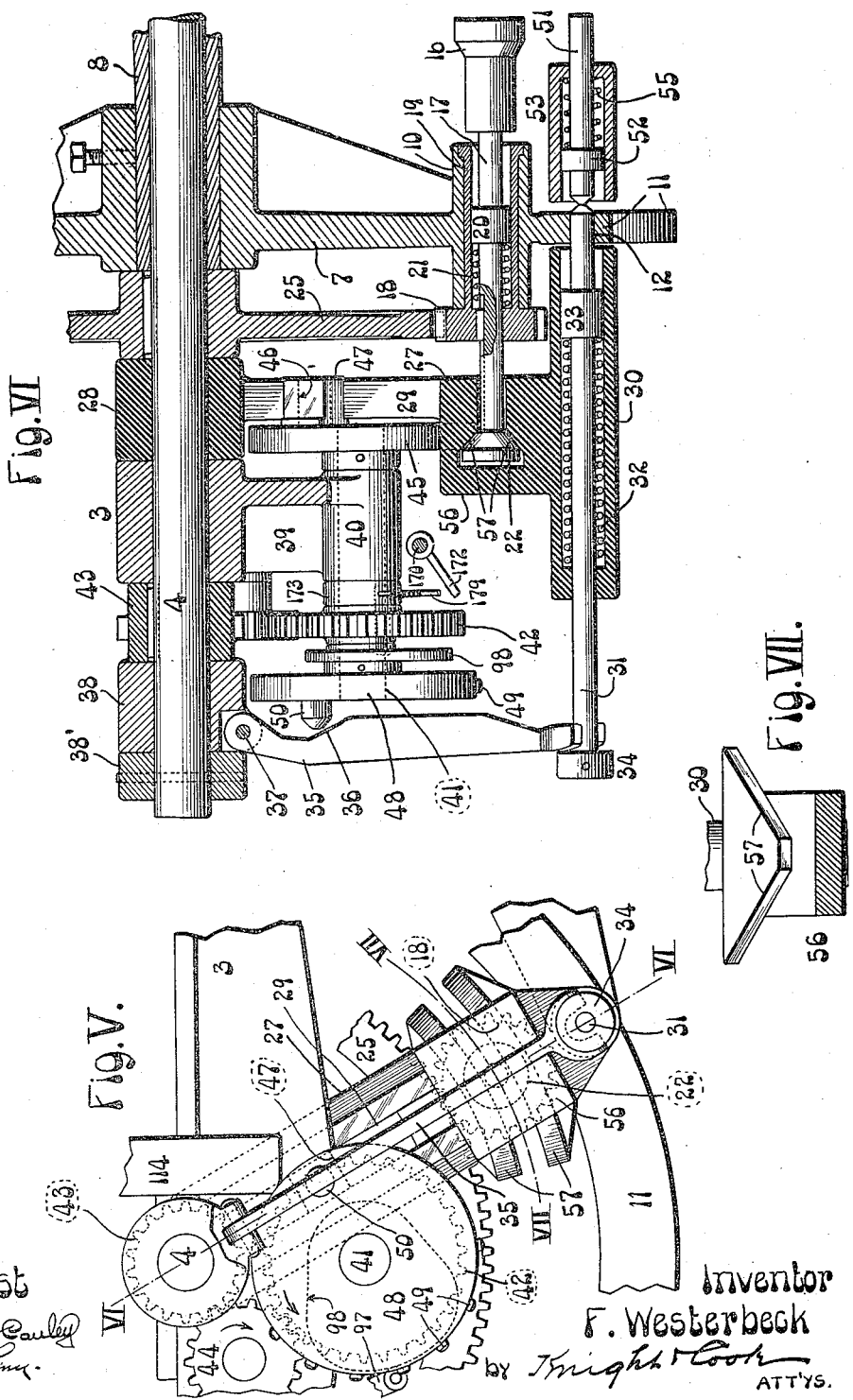
Attest
A. J. McCauley
E. B. Linn
Inventor
F. Westerbeck
by Knight & Cook
ATT'YS.

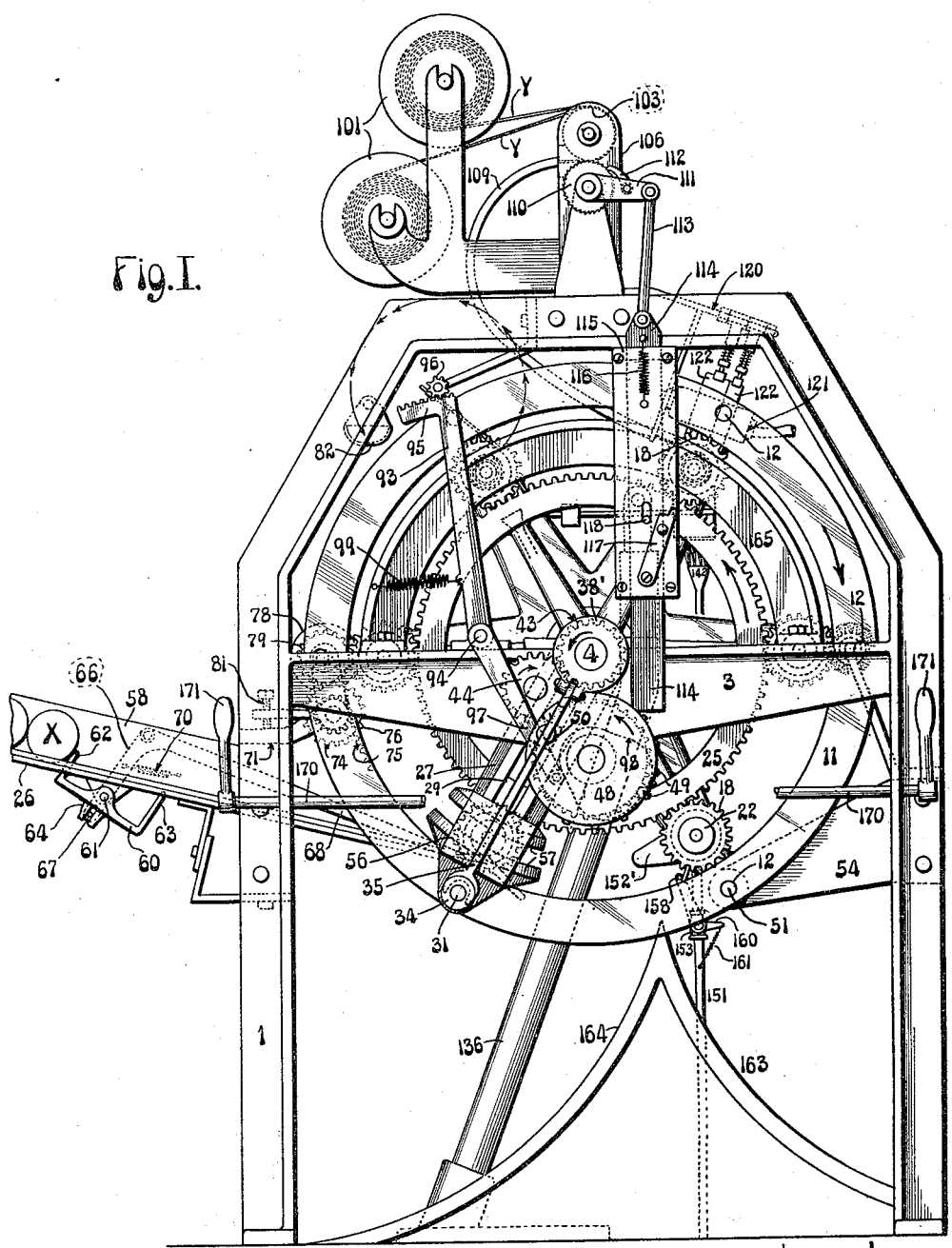

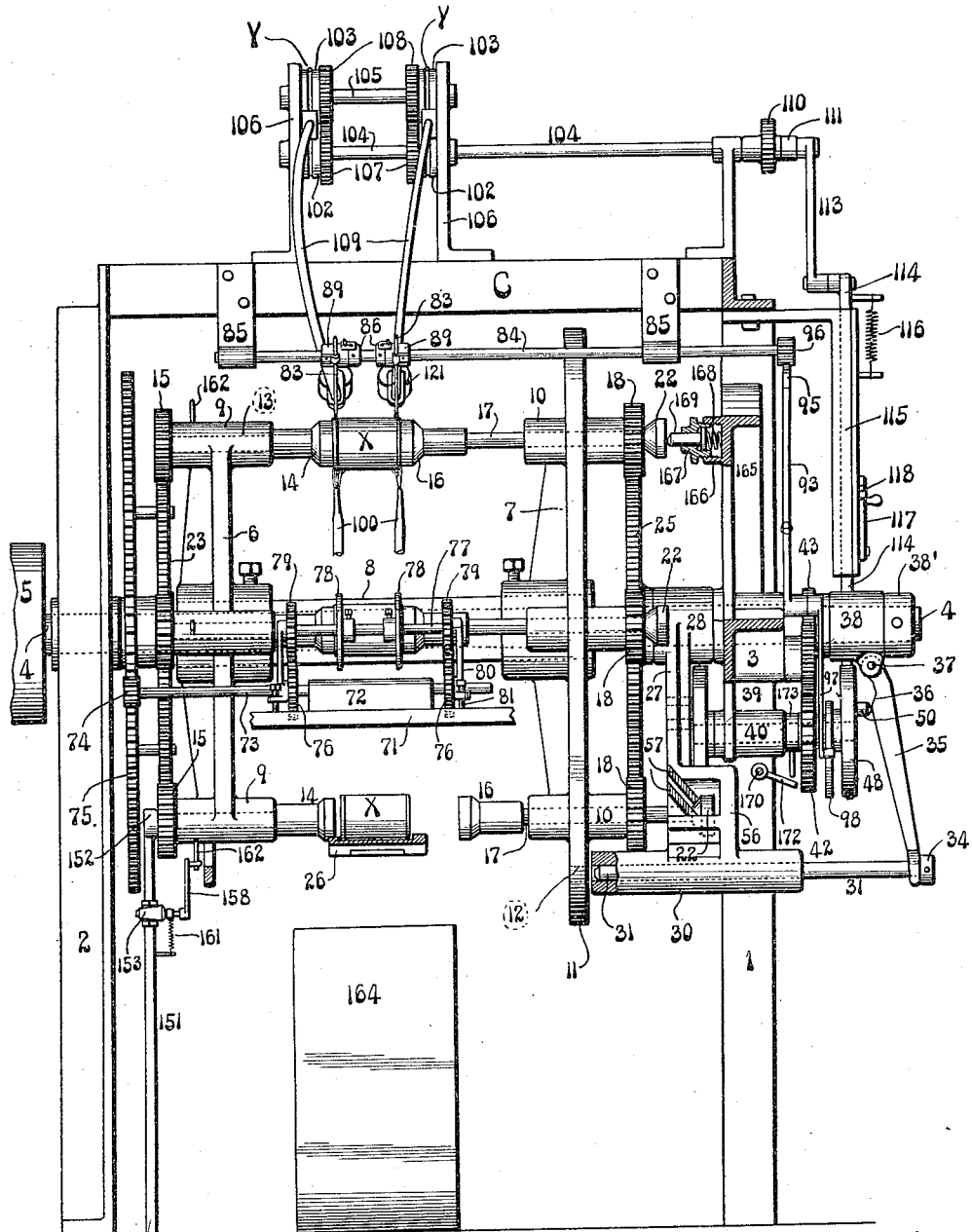

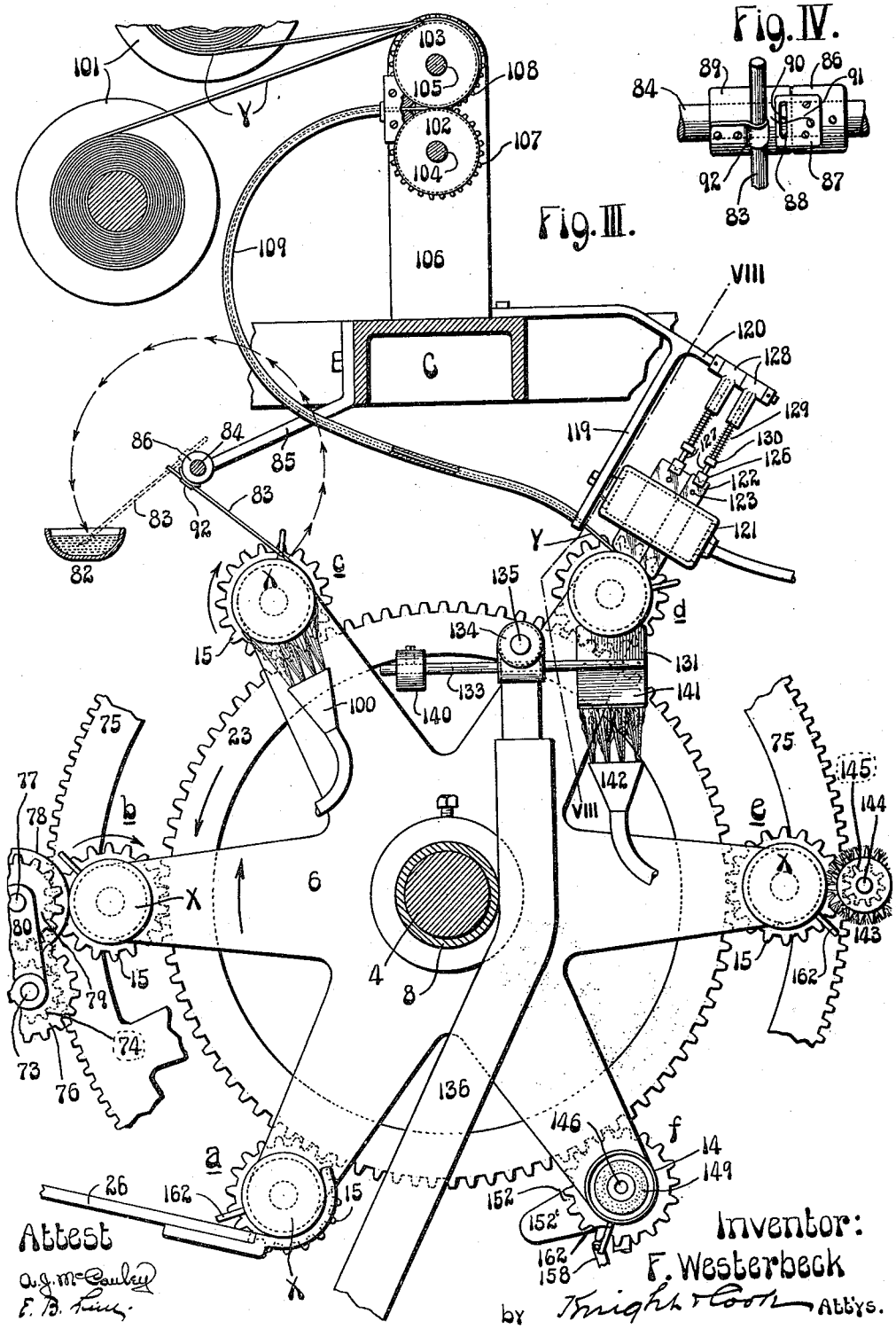

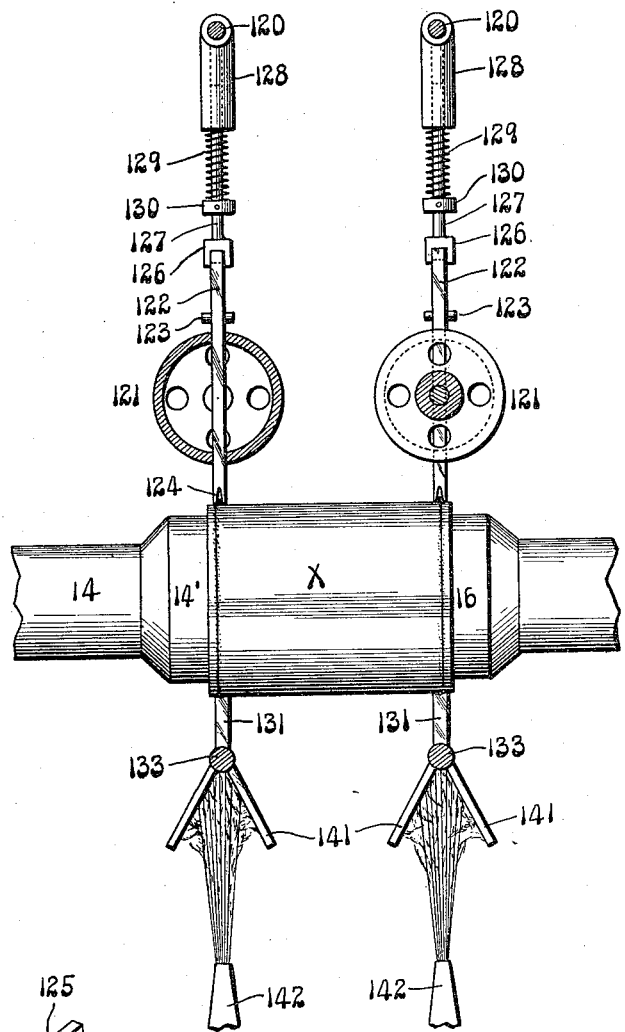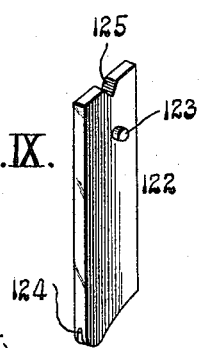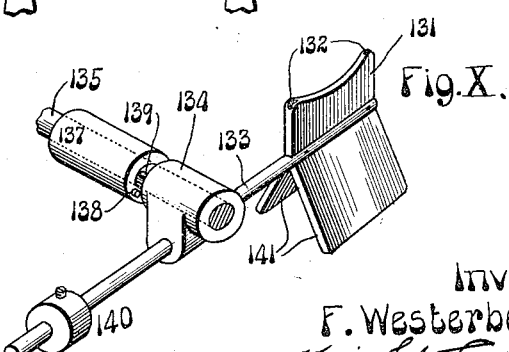

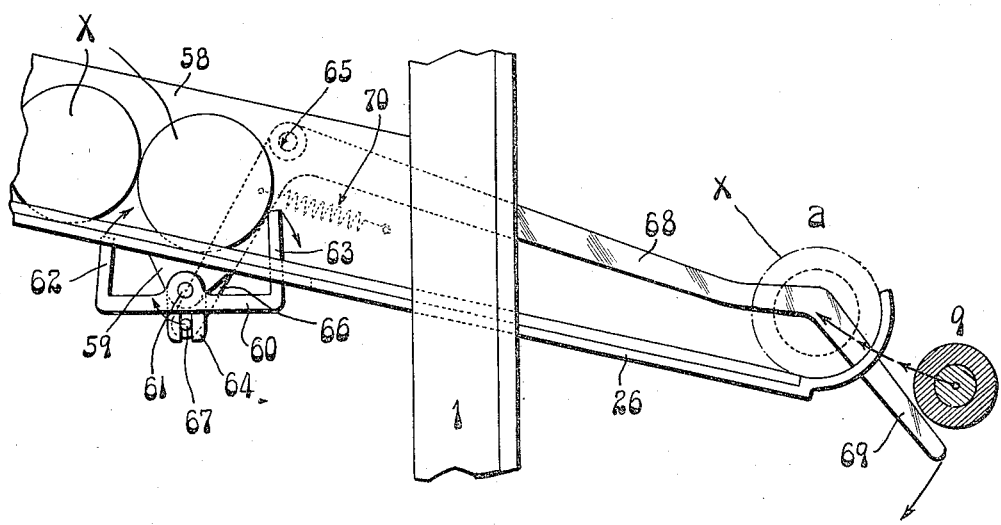
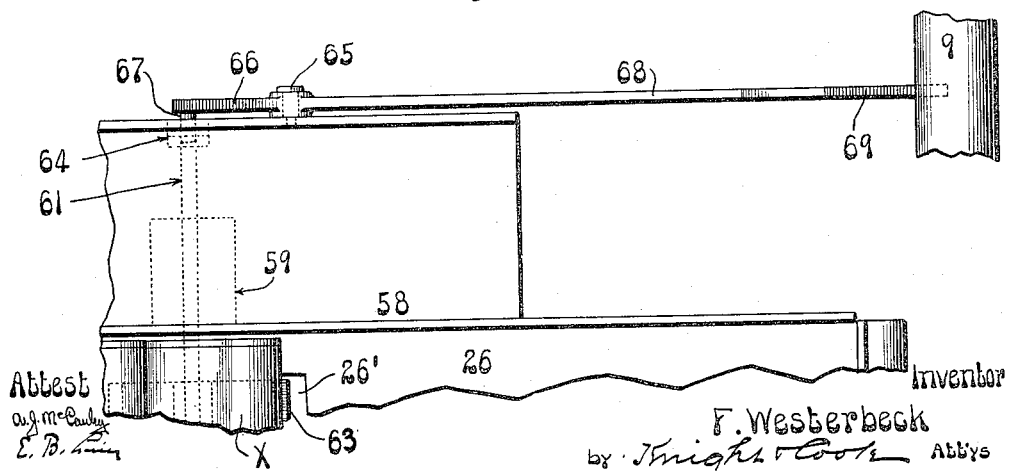

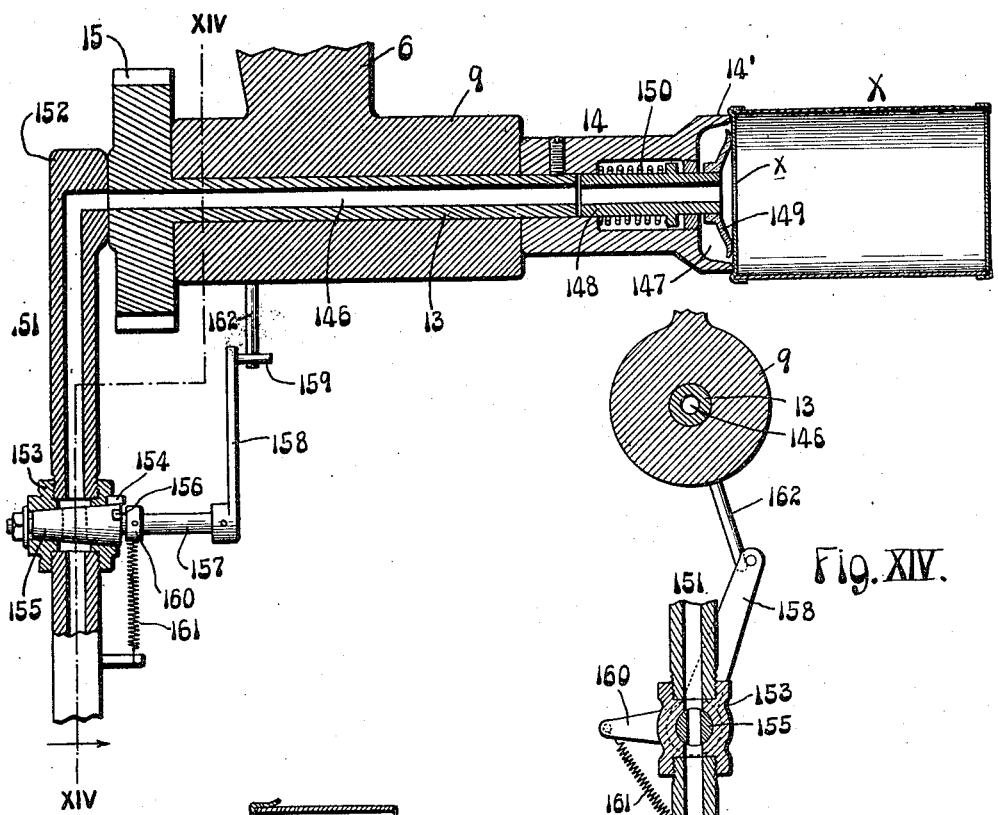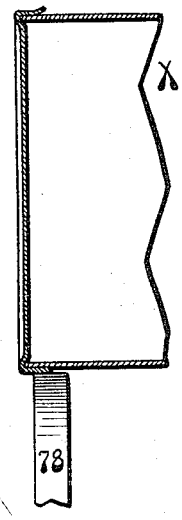

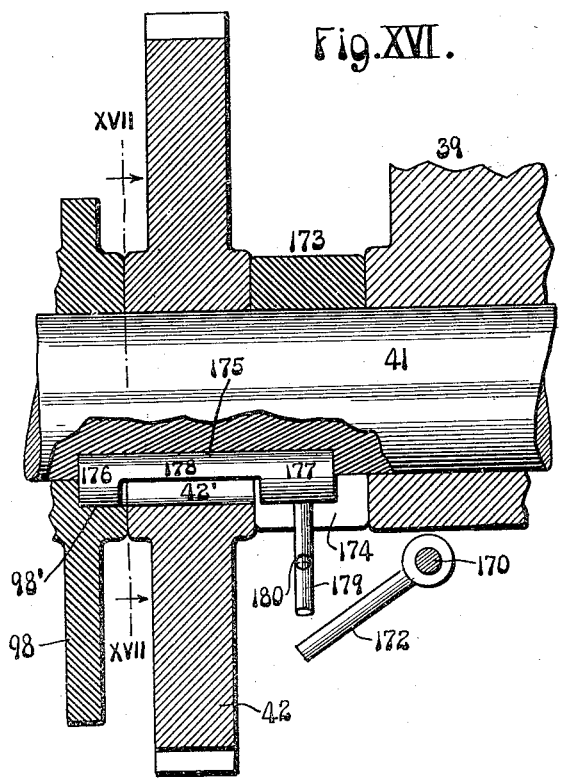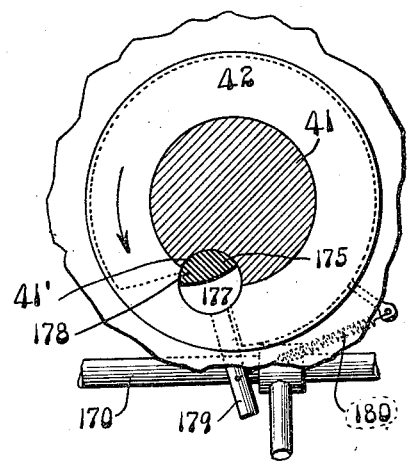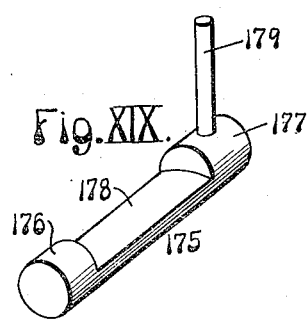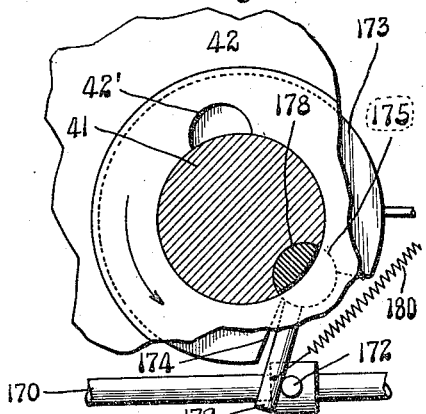

UNITED STATES PATENT OFFICE.

FREDERICK WESTERBECK, OF ST. LOUIS, MISSOURI.

CAN-MAKING MACHINE.

1,129,532. Specification of Letters Patent. Patented Feb. 23, 1915.

Application filed August 6, 1913. Serial No. 783,267.

*To all whom it may concern:*

Be it known that I, FREDERICK WESTERBECK, a citizen of the United States of America, residing in the city of St. Louis and State of Missouri, have invented certain new and useful Improvements in Can-Making Machines, of which the following is a full, clear, and exact description, reference being had to the accompanying drawing, forming a part of this specification.

My invention relates to a machine for making sheet metal cans, and has mainly for its object the production of a machine of this kind including a revoluble can conveyer, means for revolving said can conveyer step by step, rotatable can holders mounted in said conveyer, means for rotating the can holders, means for causing the cans to be caught by the can holders, and mechanisms for performing, successively, the several operations of crimping the heads to the bodies of the cans, applying flux, feeding solder, soldering, brushing or wiping, testing, and for selecting the perfect from the imperfect cans.

Figure I is a side elevation of my can making machine. Fig. II is in part a rear elevation, and in part a vertical longitudinal section of my machine, some of the mechanism being omitted to afford a view of parts that would be hidden thereby. Fig. III is an enlarged vertical cross section through the machine. Fig. IV is an enlarged view of a fragment of the shaft that supports the flux applying brush, and the brush holder and controlling elements on said shaft. Fig. V is an enlarged elevation of the can conveyer feeding mechanism. Fig. VI is an enlarged longitudinal section of the can conveyer feeding mechanism taken on line VI—VI, Fig. V. Fig. VII is a horizontal section taken on line VII—VII Fig. V, with the parts beneath such line, except the lower cam of the feeding mechanism, omitted. Fig. VIII is an enlarged view, partly in elevation and partly in section, on line VIII—VIII, Fig. III, of the soldering irons and the can holding jaws with a can positioned between said jaws. Fig. IX is a perspective view of one of the main soldering irons. Fig. X is a perspective view of one of the auxiliary soldering irons. Fig. XI is an elevation of the runway on which the cans are delivered to the can conveyer, and the mechanism for controlling the delivery of the cans to the can conveyer. Fig. XII is a top or plan view of the parts shown in Fig. XI. Fig. XIII is an enlarged longitudinal section of the can testing mechanism combined with one set of the can holding jaws and the means for supporting and operating said jaws. Fig. XIV is a section taken on line XIV—XIV, Fig. XIII. Fig. XV is a diagrammatical view illustrative of the can crimping operation performed in the use of my machine. Fig. XVI is an enlarged section of the clutch device associated with the shaft of the can conveyer feeding mechanism. Fig. XVII is a section taken on line XVII—XVII, Fig. XVI, the rockable clutch member of the clutch being shown in active position. Fig. XVIII is a view similar to Fig. XVII with the rockable clutch member in inactive position. Fig. XIX is an enlarged perspective view of the rockable clutch member shown in Figs. XVI to XVIII inclusive.

In the drawings: 1 and 2 designate the end frames of my machine, each end frame including a transverse member 3. The transverse members serve as supports for a main shaft 4, to which power may be applied in any suitable manner, the shaft being shown (Fig. II) provided with a belt receiving pulley 5. The can conveyer of my machine is supported by the shaft 4 and is revoluble on the shaft through the medium of mechanism to be hereinafter described. The can conveyer comprises two jaw carriers 6 and 7, joined by a sleeve 8, and loosely mounted on the main shaft, these jaw carriers being revoluble in unison around said shaft. The jaw carrier 6 is provided with a plurality of bearings 9 arranged in circular series, and spaced equidistant, the bores therein being parallel with the shaft 4. The jaw carrier 7 has bearings 10 alining with the bearings 9 of the carrier 6 and, therefore, arranged in a circular series with their bores parallel with the shaft 4. The carrier 7 of the can conveyer is provided with a feed ring 11 containing perforations 12, which correspond in number to the number of pairs of bearings 9 and are spaced from each other similarly to the spacings of each set of said bearings.

The bearings 9 of the jaw carrier 6 have mounted therein shafts 13, each shaft being provided at its inner end with a jaw 14, and at its outer end with a pinion 15. The jaws 14 are opposed by jaws 16 on the inner ends of shafts 17, arranged in the bearings 10 of the jaw carrier 7. The jaw shafts 17 are splined to pinions 18, (see Fig. VI), provided with hub extensions 19 rotatable in the bearings 10, and said shafts are provided with collars or abutments 20, between which and the pinions 18 are springs 21 which tend to move the shafts 17 endwise to carry the jaws 16 toward the jaws 14, in order that cans, designated X, may be gripped between said jaws 14 and 16 while being conveyed and operated upon in my machine. Each jaw shaft 17 is provided at its outer end with a tapered head 22, the office of which will be hereinafter made clear.

Rotative movement is imparted to the jaw shafts 13 by a master wheel 23, meshing with the pinions 15 and connected to the shaft 4, so as to rotate therewith. Rotative movement is imparted to the jaw shafts 17 by a master wheel 25, fixed to the shaft 4, and meshing with the pinions 18. It should be here stated that the gearing comprising the master wheels 23 and 25 and the pinions 15 and 18 meshing, respectively, with said master wheels perform the service of rotating the jaws 14 and 16 while cans are held therebetween, the rotative movement of the jaws being provided for, in order that the cans will be rotated while several operations are being performed as will be described.

The can conveyer of my machine is revolved step by step around the main shaft 4 by feeding mechanism about to be described. Before proceeding to the description of the conveyer feeding mechanism, I will, for the sake of clearness of description, enumerate the several stations to which the coöperable can holding jaws 14 and 16 of the can conveyer move as they travel in a circular path around the axis of said conveyer. These stations are essentially a pick-up station $a$, which is in proximity to a runway 26 on which the cans are delivered to the machine, a seaming station $b$, a flux applying station $c$, a soldering station $d$, a wiping station $e$, and a testing station $f$.

I will now proceed to a description of the conveyer feeding mechanism which is shown in Figs. I, II, and V to VII, inclusive. 27 designates a swinging feeder arm loosely fitted to the main shaft 4 by its hub 28. The swinging feeder arm 27 is located on the main shaft 4 near the jaw carrier 7, and is provided at its free end with a barrel 30, parallel with the main shaft 4 and extending at one end into proximity with the feed ring 11 carried by the jaw carrier 7 of the can conveyer. 31 designates a feeder rod arranged in the barrel 30 of the feeder arm 27, this feeder rod having its inner end presented toward the feed ring 11 carried by the jaw carrier 7 of the can conveyer, and being surrounded in the barrel 30 by a spring 32, which bears against an abutment 33 on the rod, and tends to move the rod endwise toward the feed ring 11, so that its inner end may be delivered into the apertures 12 in said ring to remain therein in feeding the can conveyer, as will more fully appear in the subsequent description. 35 designates a retracting arm fitted to the feeder rod 31 and adapted to engage an abutment 34 thereon to withdraw the rod from engagement with the feed ring 11 and hold it out of engagement therewith at certain periods during the operation of my machine. The rod retracting arm 35 is provided with a cam 36, and is pivoted at 37 to a collar 38 loosely mounted on the main shaft 4, adjoined by a set collar 38', the said collar 38 being adapted to partake of movements similar to those partaken of by the feeder arm 27.

Proceeding now to a description of the mechanism for operating the feeder arm 27 so that it will be swung to and fro to impart a step by step movement to the cam conveyer, it is first to be noted, (see Fig. VI), that the frame cross bar 3 at the end of my machine at which the conveyer feeding mechanism is located is provided with a hanger 39, which supports a bearing 40. The bearing 40 has arranged therein a shaft 41 supporting a gear wheel 42. The gear wheel 42 receives motion from the main shaft 4 transmitted thereto by a pinion 43, fixed to said main shaft, and an intermediate pinion 44, in mesh with both the pinion 43 and the gear wheel 42, (see Fig. V).

45 is a crank wheel fixed to the shaft 41 and located adjacent to the oscillating feeder arm 27. This crank wheel is provided with a crank 46 on which is arranged a crank block 47, operable in a slot 29 in the feeder arm 27. During rotation of the shaft 41 through the medium of the main shaft 4, as explained, the crank wheel 45 acts to impart a swinging motion to the feeder arm 27 commensurate with that obtained from the travel of the crank pin 46 and the crank block thereon. It may be further stated at this point that the degree of motion just referred to is such as to cause the conveyer feeding elements comprising the feeder arm 27 and feeder rod 31 to move the can conveyer a portion of a revolution corresponding to the distance between adjoining stations to which the can holding jaws 14 and 16 of the can conveyer are moved.

The shaft 41 has fixed to it a disk 48, at the periphery of which are tappets or protuberances 49, having a function to be explained. Said disk is located adjacent to the feeder rod retracting arm 35 and is provided with a stud 50 arranged eccentric to the axis of the shaft 41, and adapted to engage the cam 36 of said retracting arm at intervals during the rotation of the disk for the purpose of imparting such movement to the arm as to withdraw the feeder rod 31 from active position and hold it retracted for a limited period.

51 designates a latch bolt adapted to enter the apertures 12 in the feed ring 11 of the the can conveyer to restrain the can conveyer from movement at the termination of each step by step movement imparted thereto through the medium of the conveyer feeding mechanism. The latch bolt is operable in a box 53, (see Fig. VI), supported by a bracket 54, (Fig. I), attached to the end frame 1. On the latch bolt is an abutment 52 between which and the rear end of the box 53 is a spring 55, which tends to move the latch bolt toward the side of the feed ring 11.

The swinging feeder arm 27 is provided with a cam head 56, through which the outer ends of the jaw shafts 17 and the tapered heads 22 thereon pass during the movements of the feeder arm. In said head are V-shaped cams 57, the faces of which converge in an outward direction, these cams receive the tapering faces innermost on the jaw shaft heads 22 and, as will appear more clearly from the following description, the said heads are caused to ride on said cams 57 in such manner as to retract the jaws 16 from can holding positions when cans are to be discharged from the machine, the jaws being afterward moved endwise in a reverse direction for the purpose of gripping cans at the pick-up station $a$.

The operation of the can conveyer of my machine through the medium of the feeding mechanism, and the operation of the can holding jaws 16 and their shafts to pick up and discharge the cans will now be described. It will first be assumed that the feeder arm 27 and the parts movable therewith are in the positions in which they are seen in Figs. I and II, the feeder arm being at the left hand when looking at the machine as seen in Fig. I, and the latch bolt 51 being present in the aperture 12 of the conveyer feed ring 11 next toward the right. It should be explained that at this time the feeder arm is located at the can pick-up station $a$, and that the feeder rod 31 is held in retracted position by engagement between the stud 50 of the disk 48, and the cam 36 of the feeder rod retracting arm 35, and, further, that the tapered head of the jaw shaft 17 at the can receiving station is at rest at the apices of the V-shaped cams 57. The main shaft of my machine being in motion acts to impart movements to the parts that will now be described. Motion is transmitted from said shaft through the pinion 43 thereon to the intermediate pinion 44, and therefrom to the gear wheel 42, whereby the shaft 41 of the conveyer feeding mechanism is rotated. As the shaft 41 rotates, it carries the crank wheel 45 with it and the crank 46 and crank block 47 are operated in the slot 29 extending longitudinally of the feeder arm 27. In consequence of the movement of parts as stated, the crank wheel 45 causes the feeder arm and other swinging elements of the feeding mechanism to be moved toward the right hand of the machine, as viewed in Fig. I, until the feeder rod 31 is opposite the latch bolt 51, which remains at this time seated in the feed ring 11 of the can conveyer.

Before proceeding further with explanation of the operation of the feeding mechanism, it should be noted that when the feeder arm partakes of the movement referred to, it moves away from the jaw shaft 17 at the can pick-up station $a$, and the tapered head 22 on said shaft rides along the rear faces of the cams 57 to gradually escape therefrom and that, during this movement of the shaft head, the spring 21 acts to move the jaw 16 inwardly into engagement with the can on the runway 26 at the pick up station $a$, and the can becomes gripped between the opposing jaws 14 and 16 at station $a$ ready to be moved by the can conveyer when the latter is placed in motion through the medium of the conveyer feeding mechanism.

Returning to description of the feeding mechanism, it is to be observed that, inasmuch as the shaft 41 of this mechanism is in constant rotation, it will so move the disk 48 as to cause the stud 50 carried thereby to become separated for a period from the retracting arm 35, which serves to hold the feeder rod 31 retracted while the feeder arm is returning to the position illustrated in Fig. V.

Escape of the stud 50 from the feeder rod retracting arm occurs approximately at the completion of the return stroke of the feeder arm 27, and the spring 32 then acts to impart endwise movement to the feeder rod 31 whereby the inner end of said feeder arm is caused to enter the aperture 12 in the feed ring 11 of the can conveyer previously occupied by the latch bolt 51. The spring 32 is stronger than the spring 55 operable upon the latch bolt and, therefore, when the feeder rod enters the feed ring 11, it acts to force the latch bolt out of the feed ring so that the parts occupy the positions shown in Fig. VI.

The conveyer feeding mechanism being now in engagement with the can conveyer, through the medium of the feeder rod 31, the swinging members of the feeding mechanism, including the feeder arm 27 and parts carried thereby, and the feeder rod retracting arm 35, are moved forwardly from the position shown in Fig. V toward the position shown in Fig. I, to impart a step movement to the can conveyer, this motion of the parts being obtained through the medium of the shaft 41 and the crank wheel 45 on said shaft, which is coöperatively engaged with the feeder arm 27. It should be here stated that, inasmuch as the can feeding mechanism is located at the final station of the can conveyer, at which the cans are tested and then discharged, the head 22 of the jaw carrying shaft 17, which is at the final station when the feeder arm is moved thereto, enters into the cam head of the feeder arm so that it is withdrawn from the can it previously gripped, and said head remains in said cam head while the swinging members of the feeding mechanism are moving forwardly to the first or pick up station $a$ of the machine. As the swinging members of the feeding mechanism approach the can pick up station $a$, the stud 50, carried by the disk 48 on the shaft 41, again comes into engagement with the cam 36 of the feeder rod retracting arm 35, whereby said feeder rod is gradually retracted from the feed ring 11 of the can conveyer and completely withdrawn therefrom at the moment the swinging members of the feeding mechanism, and the jaw carrying shaft 17 moving therewith, reach the pick up station. Simultaneously with this complete withdrawal of the feeder rod, the latch bolt 51 enters the next succeeding aperture 12 in the feed ring 11 of the can conveyer, and the can conveyer is again locked to remain stationary, pending the return of the swinging members of the feeding mechanism, and the next feeding operation of the can conveyer similar to that described. The head 22 of the jaw carrying shaft 17 remains in the cam head of the feeder arm 27 until the feeder arm commences its return movement, and then rides inwardly on the rear faces of the cams 57 until under the influence of the spring for imparting endwise movement of the jaw carrying shaft 17, and the can gripping jaw 16 engages a can upon the runway 26 at station $a$ and causes said can to be gripped between said jaw and the opposing jaw 14. These operations occur continuously throughout the operation of my machine; and, as a result, the can conveyer, is so revolved around the main shaft 4 as to move the can gripping jaws step by step to the various stations $a$, $b$, $c$, $d$, $e$, and $f$; the can gripping jaws 14 and 16 being rotated continuously both during the step by step movement and while the jaws are at the various stations.

Having now completed the description of the can conveyer feeding mechanism, I will proceed to a description of the several mechanisms at the stations of my machine by which the can bodies and the heads loosely applied thereto are delivered to the machine and the several operations upon the cans are performed.

The can delivery runway 26 leads to the station $a$, and a can delivery mechanism is associated with said runway, whereby the cans are fed singly to said station. This mechanism is shown in Figs. I, XI and XII. At one side of the can delivery runway is a bracket 58, and in the bottom of the runway at the location of said bracket is an opening 26', (see Fig. XII). At the bottom of the runway are lugs 59, located at the opposite sides of the opening 26'.

60 is a U-shaped can feeder pivoted to the lugs 59 at 61 and having upstanding rear and forward arms 62 and 63, movable through the opening 26' in the can delivery runway. This can feeder is provided at one side with a fork 64. The can feeder 60 is operated by a double armed tripper pivoted at 65 to the bracket 58, the said tripper comprising one arm 66, having a pin 67 operable in the fork of the can feeder, and a second arm 68 extending beyond the delivery end of the runway 26, and having a downwardly inclined finger 69, which is engaged by the bearings 9 of the jaw carrier 6 when they move to station $a$ of the machine. It will be understood from this description that the finger of the tripper arm 68 is operated each time that a bearing 9 moves into contact with said finger and that, in consequence of downward movement of the tripper arm 68, the tripper arm 66 is moved rearwardly, whereby the rear upstanding arm of the can feeder is elevated into the path of travel of a can back of it upon the runway to restrain said can from forward movement. The forward upstanding arm 63 of said feeder moves downwardly and the can resting thereagainst is freed so that it will pass to the delivery end of the runway to be located as shown by dotted lines Fig. XI. A spring 70 connecting the tripper arm 66 to a fixed part of the machine serves to return the tripper to its normal position, after the tripper operating bearing 9 of the jaw carrier has moved away from the finger 69, and the can feeder is returned to its normal position, with the rear upstanding arm of the feeder lowermost and the forward upstanding arm of the feeder uppermost, thereby permitting the next foremost can to move forwardly on the runway and be caught by the feeder, ready for delivery to the pick up station $a$ on the succeeding operation of the can feeder 60. The cans, after being picked up at station a, are carried by the can conveyer to station b, where they remain in the interim between conveyer feeding operations to have the flanges of their heads crimped or flattened to the can bodies by mechanism providing for such operation. This mechanism is shown in Figs. I, II, III and XV.

71 designates a supporting bar extending longitudinally of the machine and supported by the end frames 1 and 2. Upon said supporting bar is a bearing 72, in which is mounted a drive shaft 73. The drive shaft 73 extends longitudinally of the machine and has fixed to it at one end a pinion 74, which engages a large drive wheel 75 fixed to the main shaft 4. The drive shaft 73 of the crimping mechanism has fixed to it a pair of transmission gear wheels 76.

77 is a crimping wheel shaft on which are rigidly mounted a pair of crimping wheels 78, which are adapted to rotate in contact with the flanges of the heads of the cans. The crimping wheel shaft 77 is provided with gear wheels 79 which mesh with the transmission gear wheels 76, and said crimping wheel shaft is mounted in adjustable supports 80 of L-shape, each support comprising a vertical arm, in which the crimping wheel shaft is mounted, and a horizontal arm extending over the supporting bar 71. In the last mentioned arms are adjusting screws 81, which seat on the supporting bars 71. By adjusting the screws 81, the supports 80 may be so adjusted as to move the crimping roller shaft 77 and the crimping rollers thereon toward the path of travel of the cans, in order that the crimping rollers may exert the desired pressure against the flanges of the cans to crimp or flatten them to the can bodies. It will be apparent that the large drive wheel 75, which is of greater diameter than the diameter of the can conveyer at the end of the machine at which the said drive wheel is located, operates the drive shaft 73 of the can crimping mechanism, whereby rotation is imparted to the gear wheels 76 and 79, to the crimping roller shaft 77 and to the crimping rollers 78, so that they will operate on the flanges of the can heads while the cans are being turned by the rotating can gripping jaws 14 and 16 of the can conveyer, as illustrated in Fig. XV.

The next station in my machine following the crimping station is the station c, at which flux is applied to the cans. Adjacent to the station c, and supported by the frame of my machine is a flux holding vessel 82, into which flux applying brushes are dipped and then moved to the cans while they are present at station c, the brushes serving to deposit flux throughout the circumferences of the cans while the latter are being rotated at said station. The brushes 83 are moved, as stated, through the medium of coöperating parts including a rock shaft 84, mounted in supports 85 attached to a top cross bar C of the frame of the machine. I will first explain the brush controllers on said shaft, which provide for the brushes being yieldingly held against the cans in applying flux thereto. One of these brush controllers is shown in detail in Fig. IV.

86 is a collar fixed to the rock shaft 84 and provided with a stop plate 87, which extends beyond one end of said collar, and contains a slot 88 extending transversely of said shaft. Adjoining the fixed collar 88 is a brush carrying collar 89, having a stop pin 90, which is operable in the slot 88 and receives the engagement of a spring 91 carried by the fixed collar. The handle of the flux applying brush is connected to the loose collar 89 by suitable means, such as a spring clip 92. The brush holding device just described provides for the brush being yieldingly held to the rotating cans, due to the action of the spring 91 upon the brush carrying collar 89, the movement of the latter member being regulated according to the length of the slot 88 in which the pin 90 moves.

Rocking movement is imparted to the rock shaft 84 by parts about to be described, which cause the brush to travel to the positions indicated in full and dotted lines Fig. III. The shaft rocking means comprises an arm 93, carried by a pivot shaft mounted in a suitable bearing on one of the end frame cross bars 3, (see Fig. I), the arm 93 being provided at its upper end with a toothed segment 95, which meshes with a pinion 96, on the rock shaft 84. The pivot shaft 94 has fixed to it a lever arm 97, which extends into proximity with the conveyer feeding mechanism, and is engaged by a cam 98 fixed to the shaft 41 of said feeding mechanism, (see dotted lines Figs. I, and V and full lines, Figs. II and VI). The cam 98, by operating the lever arm 97, causes it to impart rotation to the shaft 84 in one direction, and a spring 99, (see Fig. I), moves the arm 93 in the opposite direction, for a reverse movement of the shaft. It is desirable to apply heat to the cans while the flux is being applied thereto, and I provide for the application of heat to the cans at this time through the medium of burners 100 preferably gas burners, (see Figs. II and III).

I now come to a description of the soldering mechanism at station d, and also of the means for feeding solder to the cans while they are being rotated at such station. The solder used in my machine is in the form of wire solder, being designated Y. This solder is on spools 101, and it passes from said spools to grooved feed rollers 102 and 103, on shafts 104 and 105 mounted in standards 106, supported by the frame top bar C. The shafts 104 and 105 are geared to each other by wheels 107 and 108, fixed, respectively, to said shafts, and the shaft 104 has intermittent motion imparted to it, whereby the feed rollers are rotated to feed the wire solder Y therebetween, to and through tubular guides 109, leading to the soldering station $d$.

For convenience of description, the means for operating the feed rollers 102 and 103 to feed the solder into and through the guides 109 may be given at this time. 110 is a ratchet wheel fixed to the feed wheel shaft 104, and said shaft has loosely mounted thereon an arm 111, which carries a pawl 112, in engagement with said ratchet wheel. The arm 111 has pivoted to it one end of a connecting rod 113, the other end of said connecting rod being pivoted to a reciprocating bar 114, (see Figs. I and II), which is loosely arranged in a guide 115 attached to a fixed part of the machine, so that it is in juxtaposition to the conveyer feeding mechanism, and the reciprocating bar therein is located above the disk 48 of said feeding mechanism. A spring 116 connects the reciprocating bar 114 to the guide 115, and tends to move said bar downwardly. The lower end of the reciprocating bar 114 is located at the periphery of the disk 48 of the conveyer feeding mechanism, and, during the rotation of said disk, the tappets 49 thereon act to impart upward movement to the reciprocating bar 114, the return movement of said bar being effected by the spring 116. It will be apparent that the reciprocating bar 114 is, by the described elements, so moved as to cause the pawl 112 carried by the arm 111 to operate the ratchet wheel 110 at frequent intervals, whereby the wire solder is fed into and through the guides 109 leading to the soldering station $d$. It may be added that whenever, for any reason, it is desired to stop the operation of the solder feeding mechanism, such stoppage may be accomplished by elevating the reciprocating bar 114 so that it is withdrawn from the path of travel of the tappets on the disk 48, and sustaining said bar in its elevated position through the medium of a latch 117 on the guide 115, beneath a pin 118 on the reciprocating bar extending through a slot in said guide, as seen in Fig. I.

The soldering devices of my machine are shown in Figs. I, III and VIII to X, inclusive, and it preferably comprises main soldering members located above the cans when they are at the soldering station $d$, and auxiliary soldering devices located beneath the cans when at such station. The main soldering devices comprise in each instance a plurality of soldering irons and a burner for heating them, these parts being supported by a bracket 119, (see Fig. III).

121 are chambered gas burners supported by the bracket 119, and overhanging the cans when they are at station $d$, the said burners being provided with slots in which pluralities of soldering irons 122 are movably positioned. I may, at this point, make mention of the fact that I have found the use of a plurality of soldering irons, as distinguished from the use of a single soldering iron in a machine of the type to which my invention relates, to be greatly desirable, for the reason that they contact much more perfectly with the cans to perform the service required than a single soldering iron of the same width; and although I have shown but two of the irons 122 in each soldering device, it is obvious that a greater number may be utilized, with greater advantage. I may also add that the use of a chambered burner through which the soldering irons pass is of importance, in order that the irons may be heated to the most satisfactory degree.

The soldering irons 122 are limited in their endwise movement by stops 123 thereon, which engage the burners to so limit the movement of the irons as to permit the cans to pass thereunder, as they reach the soldering station. The soldering irons are provided at their inner ends with grooves 124, (see Figs. VIII and IX), into which the wire solder enters as it passes from the guides 109 to the cans it is to be applied to by the soldering irons, these grooves serving to direct the solder beneath the soldering irons and to prevent it from spreading away from the seams at the junctions of the flanges of the can heads and the can bodies. Each soldering iron 122 is provided at its outer end with a notch 125, which receives a V-shaped member within a forked head 126, carried by the presser rod 127, through the medium of which the soldering iron is held against the cans it operates on. The presser rods 127 are directed in their movements by guides 128, mounted on the arm 120 of the bracket 119, and are surrounded by presser springs 129 situated between said guides and abutments 130 on the rods.

Auxiliary soldering irons 131 are located beneath the main soldering irons 122 and serve to increase the efficiency of the soldering operation carried out in my machine. These auxiliary soldering irons are provided at their upper edges with grooves 132, similar to the grooves 124 in the main soldering irons, and they are supported by rods 133, mounted in collars 134, loosely arranged on a rod 135. The rod 135 is supported in any suitable manner, preferably by a post 136, extending upwardly from the base of the machine, and said rod has fixed to it collars 137 provided with stops 138 adapted to be engaged by stops 139 carried by the collars 134. The auxiliary iron supporting rods 133 extend beyond the collars 134, and have thereon adjustable weights 140, by which the auxiliary soldering irons are upheld in position to engage the cans, the upward movement of said irons being limited by the stops 138 and 139. Beneath the auxiliary soldering irons 131 and supported by the auxiliary supporting rods 133 are flaring wings 141, between which flames are directed from burners 142, (see Figs. III and VIII) to heat said irons.

At station *e* the cans are wiped or brushed for the removal of loose solder adhering thereto, the elements in my machine utilized for this purpose being a brush, or brushes, 143, (see Figs. I and III), and a shaft 144 extending longitudinally of the machine provided with a pinion 145, which meshes with the large drive wheel 75 on the main shaft 4. The brush or brushes 143 are rotated through the medium of the shaft and its pinion in a direction the opposite of the direction of rotation of the cans, and the cans are, therefore, efficiently wiped while they are at the wiping station.

I next pass to the station *f* which is the final station, and is that at which the cans are first tested to detect the leaky cans, the leaky cans being dropped at such station and the perfect cans being carried slightly forwardly from the said station, so that they will be separated from the faulty cans. The can testing mechanism is shown in Figs. I to III, inclusive, and Figs. XIII and XIV.

The jaw carrying shafts 13, which are operable in the bearings 9 of the can conveyer jaw carrier 6, enter into the structure of the can testing mechanism, and these shafts, as shown most clearly in Fig. XIII, are tubular, to provide ducts 146 therein, which extend also through the pinions 15, in engagement with the drive wheel 23, for the purpose of rotating the shafts 13. Each jaw 14 is provided at its forward end with an annulus 14' which presses against the adjacent end of a can presented thereto by the opposing jaw 16, and the presence of said annulus at the end of the jaw provides a cavity 147, which receives a member to be presently more particularly referred to. In the jaws 14 are tubes 148, having ducts therein in registration with the ducts 146 in the shafts 13. These tubes have fixed to them at their forward ends suction disks 149, which are arranged in the cavities 147, the said suction heads being of rubber, or other suitable material, which will permit of their being tightly seated against the heads of the cans, in which filling openings *x* are present. Each tube 148 is surrounded by a spring 150, located within the corresponding jaw 14 and which serves to yieldingly hold the suction disk 149 attached to the tube in contact with the head of the can against which it bears.

151 designates a suction pipe located at station *f*, the said pipe being provided with a head 152, to which the pinions 15 on the jaw carrying shafts 13 are presented when they are brought to station *f* by a step movement of the can conveyer, the suction pipe and duct 146 in a jaw carrying shaft and its pinion being at such time and place in communication with the suction tube.

153 designates a valve housing arranged in the suction pipe 151, and 155 is a valve operable in said valve housing to control the suctional draft through said pipe. The valve 155 is susceptible of only a partial rotation, due to the presence of stops 154 and 155 located, respectively, on the valve housing and valve. Said valve is provided with a stem 157, to which a lever arm 158 is fixed, the said lever arm being provided at its free end with a laterally extending pin 159. The lever arm 158 is normally held in such position as to present its free end toward the bearings 9 of the jaw carrier 6, by an arm 160 fixed to the valve stem, and a spring 161 connecting said arm to the suction pipe 151. The several bearings 9 of the jaw carrying head 6 are provided with fingers 162, adapted to engage the pins 159, for the purpose of operating the lever arms 158, whereby the valves 155 are operated as each jaw 114, and the parts co-existent therewith, are moved to station *f* in my machine.

It should now be stated that the registration of the duct 146 with the suction pipe 151 occurs just previous to the retraction of each can gripping jaw 16 by the conveyer feeding mechanism and the communication between the can resting against a particular jaw 14 and the suction pipe 151 being established through the medium of the hollow jaw carrying shaft 113 and the tube 148 carrying the suction disk 149, air is withdrawn from the can to the suction pipe. If the can is perfect, it is held to the suction disk, due to the suctional action when the opposing jaw 16 is withdrawn from the can; but, if the can is a leaky one, the suctional action will not act to retain it against the jaw 14, and it will fall from said jaw onto the runway 163 beneath station *f*; whereas, if the can is perfect, it will be held in contact with the jaw 14 to descend onto a second runway 164 when the jaw is moved from station *f* toward the pick up station *a*. When the can conveyer has a succeeding step movement imparted to it, the suctional action acting to retain the perfect can is maintained in the can and in the duct 146 in the jaw carrying shaft 13, for a period of sufficient length to carry the can to a point over the runway 164. This is accomplished by providing the suction pipe head 152 with an extension 152', (see Fig. I), against which the pinion on the jaw carrying shaft rides to keep the rear end of the duct 146 closed.

It is desirable in making certain cans, to increase the pressure exerted on the cans by the jaws 16, in order that the cans will be more efficiently held between the jaws 14 and 16 than is provided for by the springs 21, which exert inward pressure on the said jaws. I provide for the additional pressure in such instances by auxiliary pressure means supported by a segment 165, mounted on the cross bar 3 of the end frame 1, and occupying an arc of a circle adjacent the path of travel of the shaft heads 22 of can carrying jaws 16. The auxiliary pressure means supported by this segment may be located at any or all of the stations b, c, d, and e. Each auxiliary pressure device comprises a housing spring box 166 closed by an adjustable plug 167, the spring housing box containing a spring 168 bearing against a pressure pin 169 loosely mounted in the plug 167. When the heads 22 of the jaw carrying shafts 17 are brought to the stations at which the auxiliary pressure devices are located, the heads of said shafts ride into contact with the presser pins 169, and the springs 168 press said pins forcibly against the heads of the jaw carrying shafts to supplement the action of the springs 21 in holding the jaws 16 pressed against the cans between them and the jaws 14.

There remains to be described at this time only a clutch device, by which the can conveyer feeding mechanism of my machine may be thrown out of service whenever it is desired to retain a can being operated upon at any particular station for a greater length of time than it would be retained in the ordinary operation of the machine. This clutch device appears in Figs. I, II, VI and XVI to XIX, inclusive. 170 is a clutch operating rod extending transversely of my machine and rotatably supported by the end frame 1, the shaft being located in proximity with the gear wheel 42 of the can conveyer feeding mechanism. The shaft 170 is provided with one or more handles 171, by which it may be rocked, and has fixed to it a trip arm 172 in juxtaposition to the feeding mechanism gear wheel 42.

The conveyer feeding mechanism shaft 41 is provided with a longitudinal semi-cylindrical recess 41' of greater length than the width of the gear wheel 42, and said gear wheel is provided with a semi-cylindrical recess 42' extending outwardly from its bore, which is adapted to register with the recess in said shaft. The cam 98, adjacent the gear wheel 42 is provided with a recess 98', similar to the recess 42' in the gear wheel. At the side of the gear wheel 42, opposite that occupied by the cam 98, is a loose collar 173, which contains a notch 174.

175 designates a rockable clutch rod having cylindrical ends 176 and 177, the former of which is rotatably mounted in the recess in the shaft 41 and the registering recess in the cam 98, while the other cylindrical end of said clutch rod is located in the opposite end of the groove in the shaft 41, and in the notch in the loose collar 173. The clutch rod 175 is cut away to form a central semi-cylindrical clutch element 178, which is of a length equal to or greater than the length of the recess 42' in the gear wheel 42. The clutch rod 175 is provided with an arm 179, which is connected by a spring 180, to the collar 173.

Wherever it is desired to discontinue the feeding of the can conveyer while the elements operable upon the cans continue their operation thereon, the conveyer feeding mechanism is thrown out of operation by rotating the clutch operating shaft 170 so that the arm 172 thereon will engage the arm 179 of the clutch rod 175. The arm 172, by riding against the arm 179 to the position illustrated in Fig. XVIII acts to rotate the clutch rod 175 to such degree that the central semi-cylindrical portion thereof, previously present in part in the recess in the shaft 41 and in part in the wheel 42, as seen in Figs. XVI and XVII, is moved out of the recess in the wheel. The wheel 42 will then be rotated through the medium of its driving connection with the main shaft 4 turning loosely around the shaft 41 without operating it, and, as a consequence, the can conveyer feeding mechanism will remain inactive until the clutch rod 175 is permitted to resume its former position by the action of the spring 180.

In conclusion, I desire to add that by the use of my machine any desired amount of solder may be applied to the cans operated upon while they are present at the soldering station of the machine. I also desire to make mention of the fact that in the use of my machine there is absolutely no opportunity for the ingress of solder into the cans, as is well known to be possible in the bath or dipping processes of soldering cans.

I claim:—

1. In a can making machine, mechanisms located at spaced stations for performing a variety of operations upon the cans, a can conveyer, feeding mechanism for imparting a step by step movement to said can conveyer, said feeding mechanism including a member for interlocking with said can conveyer, and a latch device for engagement with said can conveyer adapted to be unlocked by said member of the feeding mechanism when it engages the can conveyer.

2. In a can making machine, a can conveyer, a feeder for imparting an intermittent movement to said can conveyer, a crank adapted to impart an oscillating movement to said feeder, a feeder releasing device adapted to swing with said feeder, and a rotatable member movable in unison with said crank adapted to operate said feeder releasing device.

3. In a can making machine, a can conveyer, and means for imparting an intermittent movement to said can conveyer, said means including a feeder having a feeder rod adapted to engage said can conveyer, a crank for oscillating said feeder, a feeder rod retracting arm adapted to oscillate with said feeder, and a rotatable member movable in unison with said crank adapted to operate said feeder rod retracting arm.

4. In a can making machine, a rotatable shaft, a can conveyer loosely mounted on said shaft, a feeder arm loosely supported by said shaft, a feeder rod adapted to engage said can conveyer, a feeder rod retracting arm loosely supported by said shaft, a rotatable crank adapted to oscillate said feeder arm and the feeder rod retracting arm, and a rotatable member movable along said feeder rod retracting arm adapted to operate said arm to release the feeder rod from said can conveyer.

5. In a machine of the character described, mechanisms for performing a variety of operations upon cans, said mechanisms being located at spaced stations and the machine being provided with an intake station and a discharge station; the said mechanisms including a can conveyer movable step by step and provided with opposing can holding members; and an oscillatory arm, movable with said conveyer, operable to shift one of the can holding members so as to release the can at said discharge station and adapted to maintain said can holding member in its shifted position until the latter reaches the intake station.

6. In a machine of the character described, mechanisms for performing a variety of operations upon cans, said mechanisms being located at spaced stations and the machine being provided with an intake station and a discharge station; the said mechanisms including a can conveyer movable step by step and provided with opposing can holding members; and an oscillatory shifter arm movable from the discharge station to the intake station, said oscillatory shifter arm being provided with means for shifting one of the can holding members.

7. In a can making machine, a can holder, a soldering device including a solder feeder, said solder feeder including a rotatable drive member provided with tappets, and an intermediate member driven through the medium of said tappets, and a latch device for holding said intermediate member away from the path of said tappets.

8. In a can making machine, mechanisms for performing a variety of operations upon cans, said mechanisms being located at spaced stations, a can conveyer movable step by step to carry the cans from station to station, can holding members carried by said can conveyer in pairs, one can holding member of each pair being movable relative to the other, and a can releasing member movable from one station to another station with said can conveyer and adapted to withdraw the movable can holding members from the cans at one of the stations, said can releasing member being provided with means for retaining the movable can holding members in the last named position while the can conveyer and the can releasing member are moving in unison.

9. In a can making machine, mechanisms for performing a variety of operations upon cans, said mechanisms being located at spaced stations, a can conveyer movable step by step to carry the cans from station to station, a series of can holding members carried by said can conveyer, a series of spring pressed can holding members opposing the first mentioned can holding members, a can releasing arm movable from one station to another station with said can conveyer, and means carried by said can releasing arm for retracting said spring pressed can holding members.

10. The combination of a can conveyer movable step by step, opposing can holding members carried by said can conveyer, and a can releasing member adapted to partake of the step by step movement of said can conveyer, said can releasing member being provided with means for operating one of said can holding members.

11. The combination of a can conveyer movable step by step, opposing can holding members carried by said can conveyer, and a can releasing member adapted to partake of the step by step movement of said can conveyer, said can releasing member being provided with means for moving one of said can holding members from the cans, the last named means being adapted to retain the released can holder in its inoperative position while the can conveyer is moving one step.

12. In a can making machine, a can conveyer, a conveyer feeder, a crank for oscillating said feeder, said feeder including means for interlocking it with said can conveyer at the end of an oscillation in one direction, and a crank for unlocking said feeder from said can conveyer at the end of the oscillation in one direction.

13. In a can making machine, a can conveyer, an oscillating conveyer feeder, a crank for oscillating said feeder, said feeder being adapted to interlock with said can conveyer at the end of an oscillation in one direction, and a crank for unlocking said feeder from said can conveyer at the end of the oscillation in the other direction, said cranks being movable about a common axis.

14. In a can making machine, a can conveyer, a conveyer feeder, means for oscillating said feeder, said feeder being provided with a latch pin adapted to enter said can conveyer at the end of an oscillation in one direction, means for unlocking said feeder from said can conveyer at the end of the oscillation in the other direction, and a yieldable latch bolt for holding said can conveyer when it is unlocked from the feeder, the said yieldable latch bolt being operable by the latch pin of the feeder.

15. In a can making machine, a can conveyer, means for rotating the cans carried by said can conveyer, a soldering device including a plurality of yieldable soldering irons arranged on opposite sides of the path of the cans carried by said can conveyer, and means for operating said can conveyer intermittently to carry the cans entirely through the space between said yieldable soldering irons with an interval of rest while the cans are located directly between said yieldable soldering irons.

16. In a can making machine, a rotatable can conveyer adapted to carry cans in a substantially circular path about the axis of said can conveyer, a soldering device including a plurality of yieldable soldering irons arranged on opposite sides of the substantially circular path of the cans, and means for imparting an intermittent movement to said can conveyer so as to carry the cans entirely through the space between said yieldable soldering irons with an interval of rest while the soldering irons are engaged with substantially opposite sides of the cans.

17. In a can making machine, a can conveyer, can holders carried by said can conveyer, a main soldering iron, means for conducting solder to said main soldering iron, an auxiliary soldering iron opposing said main soldering iron and adapted to supplement the action of said main soldering iron, and means for moving said can conveyer to carry the cans entirely through the space between said soldering irons, said soldering irons being located on opposite sides of the path of the cans.

18. In a can making machine, mechanisms for performing a variety of operations upon cans spaced from each other, a can conveyer movable step by step, can holding means carried by said conveyer, means for rotating said can holding means, feeding mechanism for automatically moving said can holding means step by step with a fixed interval of rest between such movements, and means under the control of the operator for throwing said feeding mechanism into and out of operation whereby the can conveyer is stopped and started while the can holding means continues in operation.

19. In a can making machine, a can conveyer, means for imparting a constant rotary movement to the cans held by said conveyer, a soldering device, a feeder for feeding said can conveyer, so as to shift the rotating cans intermittently thereby carrying said rotating cans to said soldering device, and means for stopping the feeder while the cans are rotating at said soldering device so as to vary the duration of the interval of rest at said soldering device.

20. In a can making machine, a can conveyer provided with constantly rotating can holders, a soldering device, feeder mechanism for feeding said can conveyer so as to shift the constantly rotating cans to said soldering device, the feeding mechanism being movable automatically while the cans are rotating at said soldering device, and means under the control of the operator for stopping said feeding mechanism while the cans are rotating at said soldering device.

21. In a can making machine, a can conveyer, a soldering device, automatic feeding mechanism for automatically feeding said can conveyer so as to move the cans intermittently with a fixed interval of rest at said soldering device, means for rotating the cans held by said can conveyer, the last named means being operable continuously and independently of said automatic feeding mechanism, and means under the control of the operator for stopping and starting said automatic feeding mechanism while the means for rotating the cans continue in operation.

22. In a can making machine, mechanisms located at spaced stations for performing a variety of operations on rotating cans, a can conveyer for carrying cans from station to station, feeding mechanism for moving said can conveyer step by step, means for rotating the cans held by said can conveyer, the last named means being operable independently of said feeding mechanism, and a clutch under the control of the operator for stopping and starting said feeding mechanism while the cans continue to rotate at the stations in response to the operation of said means for rotating the cans.

23. In a can making machine, a can conveyer, can holding means carried by said can conveyer, a soldering iron, a chambered burner in which said soldering iron is arranged, stops for limiting the movement of said soldering iron, a spring pressed arm for forcing said soldering iron into engagement with the cans, and a pivot member supporting said spring pressed arm so as to permit said arm to swing away from said soldering iron thus permitting the removal of said soldering iron from said burner.

24. In a can making machine, a can holder, and a soldering device including a burner, a soldering iron slidably fitted to said burner, a presser rod removably fitted to said soldering iron, a spring for actuating said presser rod, an arm to which said presser rod is slidably fitted, and a pivot member supporting said arm so as to permit said arm to swing toward and away from said soldering iron thus permitting the removal of said soldering iron from said burner.

FREDERICK WESTERBECK.

In presence of—
E. CLARK,
E. B. LINN.

Copies of this patent may be obtained for five cents each, by addressing the "Commissioner of Patents, Washington, D. C."